United States Patent [19]

Nakatsuka

[11] 4,183,537
[45] Jan. 15, 1980

[54] LATERAL PRESSURE DETECTOR FOR USE WITH A PHONOGRAPH RECORD PLAYER

[75] Inventor: Hisayoshi Nakatsuka, Mitaka, Japan

[73] Assignee: Namiki Precision Jewel Co., Ltd., Tokyo, Japan

[21] Appl. No.: 859,537

[22] Filed: Dec. 12, 1977

[30] Foreign Application Priority Data

Jan. 14, 1977 [JP] Japan .................................. 52-3077

[51] Int. Cl.$^2$ .............................................. G11B 3/00
[52] U.S. Cl. .................................. 274/1 R; 274/23 R
[58] Field of Search ............................. 274/23 R, 1 R

[56] References Cited

U.S. PATENT DOCUMENTS

| | | | |
|---|---|---|---|
| 3,328,037 | 6/1967 | Lehmann et al. | 274/23 R |
| 3,720,796 | 3/1973 | Honma | 274/37 |

*Primary Examiner*—Steven L. Stephan
*Attorney, Agent, or Firm*—Gerald J. Ferguson, Jr.; Joseph J. Baker

[57] ABSTRACT

A pick up lateral pressure detector detachably mountable on the tone arm of a photograph record player, the detector comprising a base detachably mountable with respect to the tone arm, a pivotal member so mounted with respect to the base that the axis of rotation thereof is substantially perpendicular to the surface of the phonograph record, a cantilever so mounted with respect to the pivotal member that it can oscillate with respect to the pivotal member at least in a direction substantially parallel to the phonograph record surface, a reproduction needle mounted on the cantilever adapted to engage the groove of the phonograph record, and indicating means responsive to the rotation of the pivotal member and the cantilever about the axis of rotation of the pivotal member for indicating the lateral pressure of the record groove on the reproduction needle.

7 Claims, 8 Drawing Figures

LATERAL PRESSURE DETECTOR FOR USE WITH A PHONOGRAPH RECORD PLAYER

BACKGROUND OF THE INVENTION

This invention relates to an improved lateral pressure detector for use with a phonograph record player.

FIG. 1 illustrates the general phonograph playing state of a tone arm and pick up cartridge. The line 2–4 linking the fulcrum 2 of the tone arm with the needle tip 4 of the cartridge and the center line 3-L of the cartridge 3 are offset from one another by an angle $\theta$. This is so selected as to minimize the angle of error between center line 3-L of the cartridge and the sweeping direction of the sound groove 5 at needle tip 4 in the effective length of the tone arm 1. By means of this, the error (horizontal tracking error) is held to $\pm 3°$ from the outer circumference to the inner circumference of a 30 cm LP record. In the type of offset arm which is used most at present, when the needle pressure applied to needle tip 4 is selected as Fs at the condition of negligible horizontal tracking error, a friction force $F = \mu Fs$ develops between needle tip 4 and sound groove 5 ($\mu$ is the sliding friction coefficient between the needle tip and the sound groove) in the sweeping direction of sound groove 5. Since the direction of this friction force F when seen from the fulcrum 2 of the tone arm deviates only by the offset angle $\theta$, it operates as a pulling force $F \cos \theta$ on tone arm 1 containing cartridge 3 in the direction of line 2–4 or as a force $F \sin \theta$ which revolves tone arm 1 toward the inner side of record 6. Since force $F \sin \theta$ operates as a lateral pressure of cartridge 3, it is generally termed an inside force. In order to negate this force, a force which rotates the tone arm toward the outer circumference of the record, specifically the imposition of outside force 7, is necessary. This is generally accomplished by an outside force imposition device known as an inside force canceller or an anti-skating device.

The inside force $F \sin \theta$ can be expressed as $\mu Fs \cdot \sin \theta$ as a result of the above formula for needle pressure. Specifically, since the inside force changes relative to changes in the needle pressure, the amount of outside force imposed in the anti-skating device also must change in response to the needle pressure. Moreover, since the stress received by the record at the contact area of the record groove changes with the shape of the needle tip used, the value of the slide friction coefficient $\mu$ differs with round needles, oval needles or the newer line contact needles. Accordingly, the amount of outside force imposed must also vary with the shape of the needle.

In order to determine the appropriate amount of outside force to impose, it is known to provide a record for measuring the cartridge trace having a signal with a fast amplitude velocity near the limit which the cartridge used can trace. An outside force is provided so that the output signals on the left and right channels reach the trace limit at the same time and the force is thus determined. Also see U.S. Pat. No. 3,328,037 for an apparatus for measuring the anti-skating force in pick ups.

Since the above method uses signals near the trace limit of the cartridge, values are obtained which differ from actual values of the mechanical impedance of the left and right channels of the oscillation system. In addition, since the cartridge is at the trace limit, it readily accepts resistance in the form of revolving frictional force at the fulcrum of the tone arm. Another problem concerns the material of the test record which has values different from those of ordinary records.

SUMMARY OF THE INVENTION

The present invention solves the above problems by providing a lateral pressure detector which enables the user of the pick up to readily know the amount of optimum outside force to apply at each desired needle pressure using any conventional record.

Other objects and advantages of this invention will be apparent from a reading of the following specification and claims taken with the drawing.

DETAILED DESCRIPTION OF PREFERRED EMBODIMENTS OF THE INVENTION

Figure 1:
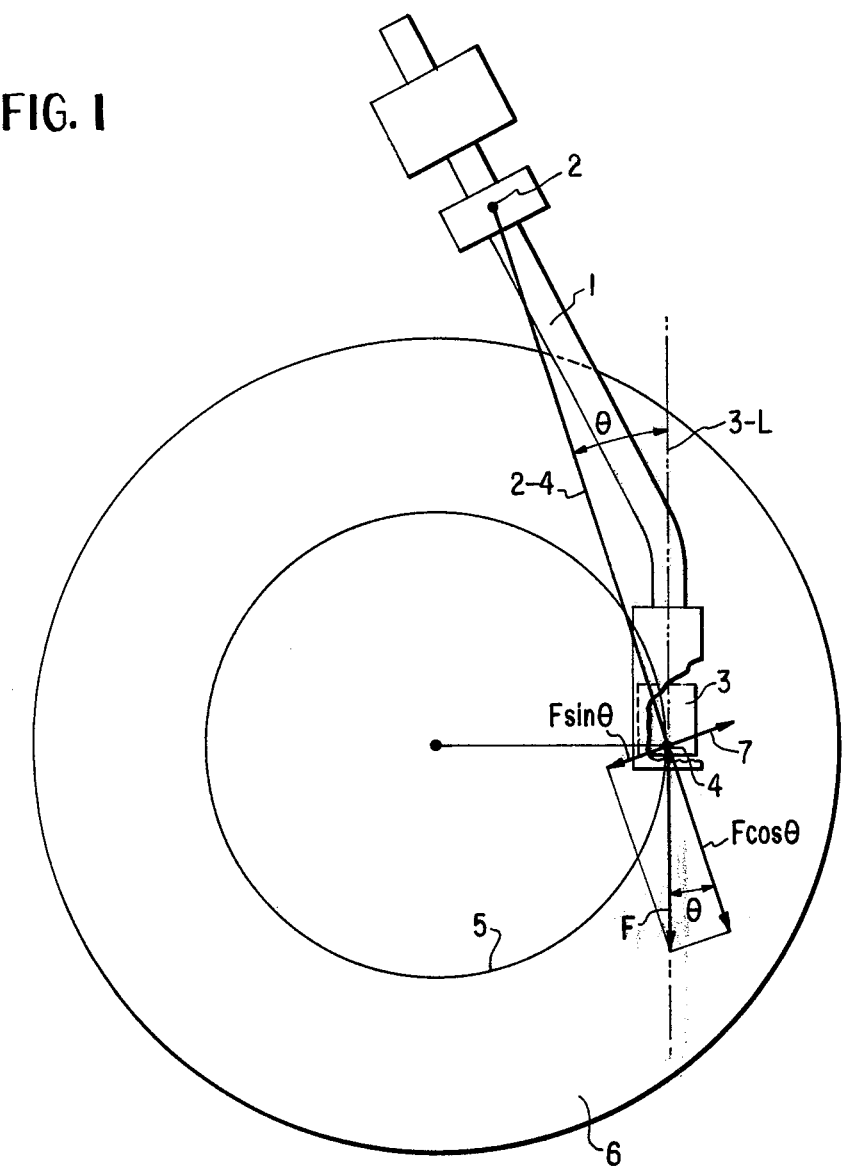
FIG. 1 is a plan view showing an offset tone arm in play on a record.

In the drawing like reference numerals refer to like parts.

Figure 2:
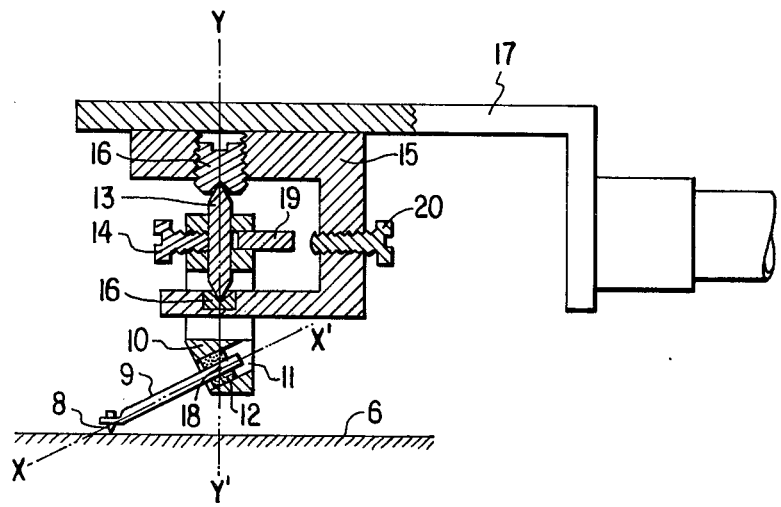
FIG. 2 is a partial cross-section of illustrative principal parts of a lateral pressure detector based on this invention.
Figure 3:
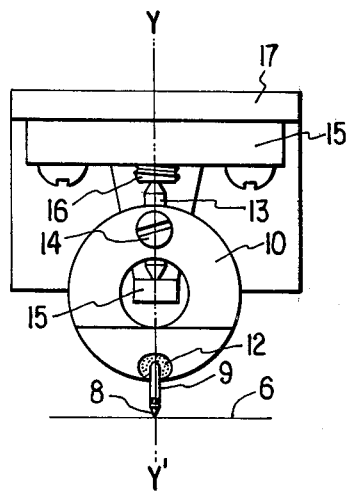
FIG. 3 is a front view of the FIG. 2 detector.

FIG. 2 is a cross-sectional outline showing illustrative principle parts of a lateral pressure detector of this invention. FIG. 3 is a front view thereof. A cantilever 9 fitted with a reproduction needle 8 is supported at an opening 11 in a part of a revolving pivot 10 by a damper 12. A pivot 13 penetrates another part of revolving pivot 10 and it is fixed to pivot 10 by a screw 14. The pivot 13 and the cantilever 9 are positioned at a suitable angle and it is desirable that the center line Y—Y' of the pivot 13 and the center line X—X' of the cantilever intersect. In addition, the center line Y—Y' of pivot 13 must be perpendicular to the record surface in the working state for reliability and for the stability of the lateral pressure detector. In such a state, the pivot 13 is supported on both sides by a pair of bearings 16 which are fitted to a base 15. The base 15 is fitted to tone arm structure 17 by the same method as the pick up cartridge.

The revolving movement of revolving pivot 10 supported by pivot 13 is independent of the oscillation movement of cantilever 9 which is supported by damper 12 but viewed from reproduction needle 8, this oscillation movement is clearly different from the movement of a reproduction needle in a cartridge. The reproduction needle 8 can revolve independently of the vibrational system of cantilever 9 only in the direction directly intersecting the center line Y—Y' of pivot 13 which is perpendicular to the record 6. Accordingly, with revolving pivot 10 fixed to base 15, the component in the vertical direction of the signal of the sound groove imposed on the reproduction needle 8 moves about a fulcrum 18 of vibration of cantilever 9 similarly to a reproduction needle in a cartridge. As for the component in the horizontal direction of the signal imposed on reproduction needle 8, needle 8 has fulcrum 18 of vibration of the cantilever and that of the revolving spindle Y—Y' of the revolving pivot.

Since the equivalent moving mass around the revolving spindle of revolving pivot 10 is much greater than the equivalent moving mass of cantilever 9 containing reproduction needle 8, revolving pivot 10 is maintained in a stationary state with regard to the signal of the audio frequency band imposed on reproduction needle 8. Accordingly, cantilever 9 can oscillate similarly to a pick up cartridge. At low frequency bands below the audio frequency, since the mechanical impedance of revolving pivot 10 falls, response becomes possible and the cantilever 9 and the revolving pivot 10 vibrate as a single unit.

Figure 4:
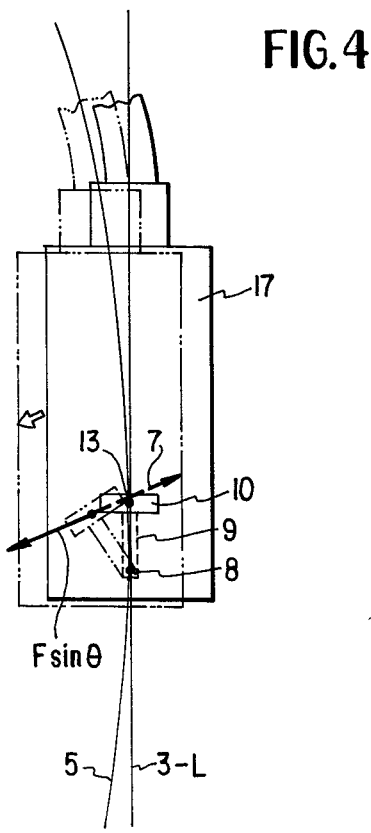
FIG. 4 is a plan view showing a cantilever and a revolving pivot which have revolved in response to lateral pressure.

When the inside force $F \sin \theta$ in this mechanism shown in FIG. 1 operates in the tone arm, a lateral force which can be termed a direct current signal is received and the reproduction needle 8 remains in the sound groove as shown in the plan view of FIG. 4. The revolving pivot 10 and cantilever 9 revolve counterclockwise and pivot 13 as well as the tone arm structure 17 shift toward the inner circumference of the record. In this state, if an outside force 7 were applied which added the same force as the inside force $F \sin \theta$ in precisely the opposite direction, the pivot 13 would return to the line 3-L which represents the sound groove sweep direction at the needle tip which would exist.

This invention is directed to a lateral pressure detector in which revolving pivot 10, supporting cantilever 9, revolves in a horizontal direction due to the lateral pressures of the inside force and outside force operating on the pick up cartridge. The intensity and direction of the lateral pressure can be determined by the revolving angle and the revolving direction of revolving pivot 10. 19 in FIG. 2 is the magnet disposed on revolving pivot 10. It is positioned so that the direction of both magnetic poles intersects at right angles the pivot 13. A screw 20 made of magnetic material penetrates base 15 and faces the magnetic pole of the magnet. This determines the dynamic center of revolving pivot 10 and brings about a righting moment during revolving. Since the distance from magnet 19 can be adjusted by screw 20, the intensity of the righting moment can be set arbitrarily. Specifically, the revolving angle of cantilever 9 which revolves in response to the lateral pressure can be adjusted to a fixed relation with respect to the intensity of the lateral pressure. As illustrated in FIG. 2, the fact that fulcrum 18 of vibration of cantilever 9 can be set along the center line Y—Y' of pivot 13 is clearly important for reliability of the revolving angle and for smoothness of revolution of revolving pivot 10 and cantilever 9.

Figure 6:
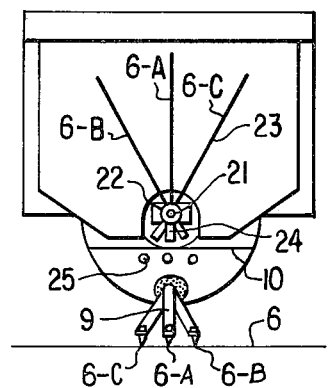
FIG. 6 is a front view of the FIG. 5 detector.
Figure 5:
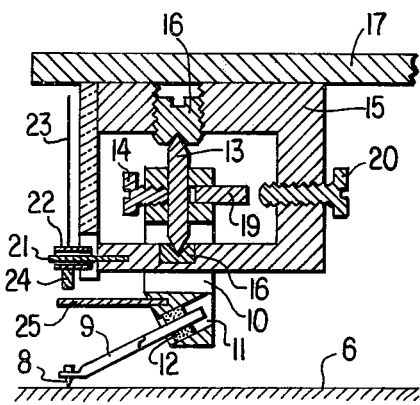
FIG. 5 is a partial cross-sectional view of a lateral pressure detector using a mechanical method of indication.
Figure 7:
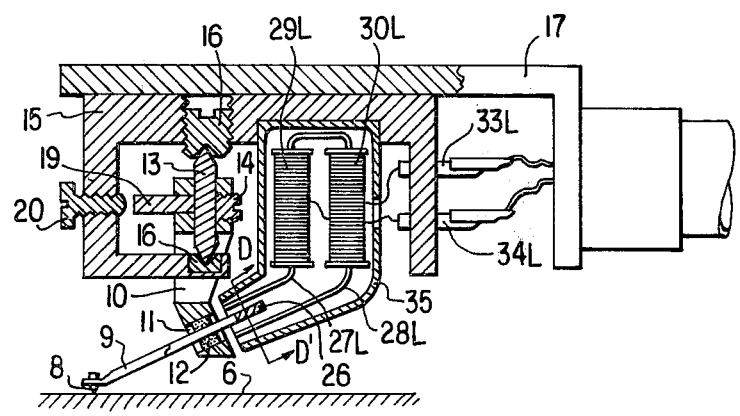
FIG. 7 is a partial cross-sectional view of a lateral pressure detector which uses an electrical method of indication.
Figure 8:
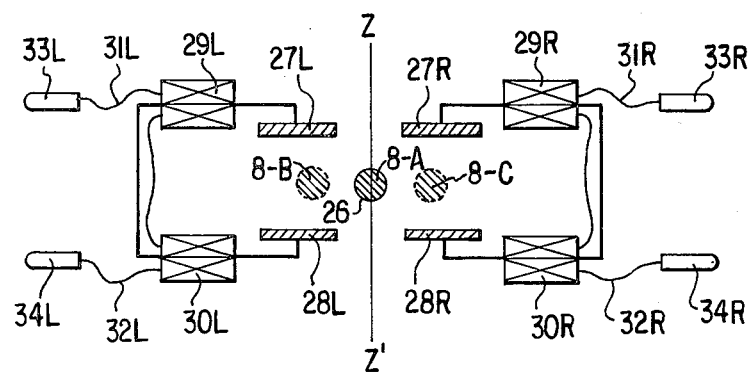
FIG. 8 is a cross-sectional view along the line D—D of FIG. 7 which explains the generating mechanism in the lateral pressure detector of FIG. 7.

There are various methods of indicating the amount of lateral pressure detected by this invention, including mechanical and electrical means. FIGS. 5 and 6 illustrate one illustrative embodiment of mechanical indication while FIGS. 7 and 8 illustrate one illustrative embodiment of electrical indication.

FIG. 5 is a lateral cross-section of an example of mechanical indication using a needle while FIG. 6 is a frontal view. A support spindle 21 composed of non-magnetic material is supported by base 15 at one end so that it is parallel to the record surface above the cantilever 9. A tube 22 is attached to the circumference of support spindle 21 for easy revolution. An indicator 23 and a magnet 24 are fitted to the top and bottom of tube 22 so as to directly intersect the center axis of the tube. Accordingly, indicator 23 and magnet 24 revolve in a plane perpendicular to the record centering on support spindle 21. In this case, the fact that indicator 23 and magnet 24 have a weight equilibrium through the support spindle 21 is necessary for smooth revolution. A moving rod 25 composed of magnetic material is supported on one end of revolving pivot 10 and is positioned opposite the bottom of magnet 24 with a small gap separating the two. Since moving rod 25 revolves in a horizontal direction receiving lateral pressure similarly to cantilever 9, magnet 24 revolves in a pendulum fashion with movement of the section facing moving rod 25 and that revolving motion is amplified by indicator 23.

The actuation of the swinging indicator which receives lateral pressure is shown in the front view of FIG. 6. In state 6-B, the indicator 23 illustrates the revolving direction of cantilever 9 in which the inside force operates most intensely while state 6-C involves a stronger outside force. 6-A is the central position of the revolving pivot 10 in which there is no lateral pressure. Here the proper direction of the cantilever 9 is provided. When the indicator exhibits state 6-A in following the sound groove, the inside force and outside force are mutually offsetting. This is an ideal state in which there is no lateral pressure operating on the lateral pressure detector now should there be any lateral pressure on the pick up cartridge inserted in place of the detector.

In the actual state of use, needle pressure equal to the needle pressure imposed on the pick up is applied, the outside force is regulated so that the indicator is in state 6-A and that amount is remembered by the anti-skating mechanism. In this case, reproduction needle 8 used in the lateral pressure detector and the reproduction needle used in the cartridge should be the identical type, whether round or oval. In addition, adjustment of the weights of the cartridge and of the lateral pressure detector when fitted to the head shell so as to be virtually equal will equalize the effects of inertial moment of the tone arm and of friction resistance at the fulcrum of the tone arm so that a more accurate effect will be achieved.

FIG. 7 is a cross-sectional figure of a lateral pressure detector which involves electrical indication of the pressure. The lateral pressure detection section corresponds to the mechanism shown in FIG. 2. A magnet 26 is fitted to the tip of cantilever 9 and the direction of the magnetic pole of magnet 26 is the direction of the center line of the cantilever. There is no contact in relation to vibration of the magnet 26. Two pairs of yokes 27L, 28L and 27R, 28R are positioned above and below as well as to the left and right at a suitable distance, see FIG. 8. FIG. 8 is a cross-section at the plane D—D' which directly intersects the two pairs of yokes and the magnet 26. It is a view from the direction of the cantilever. The yokes 27L and 28L positioned on the left side of magnet 26 are connected to response coils 29L and 30L. In a similar fashion, yokes 27R and 28R positioned on the right at a suitable distance from yokes 27L and 28L are connected to response coils 29R and 30R. The respective yokes and coils are diagrammatically represented excluding the profile shape of the yoke. The sections of yokes 27L and 27R as well as yokes 28L and 28R confronting magnet 26 in the perpendicular plane Z—Z' passing through the left and right yokes are arranged in left-right symmetry. In addition, the center line of the cantilever in the dynamic center is in the left-right direction of the yoke so as to penetrate the perpendicular plane Z—Z'. The generating circuit comprising the yokes and response coils is based on the same principle as the moving magnet type of cartridge which induces output voltage at the response coil by vibration of the magnet interposed between the yokes but in contrast to the moving magnet type of cartridge in which the facing directions of the two pairs of relative yokes intersect, in this invention, the facing directions of the two pairs of relative yokes are parallel along perpendicular plane Z—Z'.

These combined yokes and response coils are enclosed in shield case 35 so as not to contact the revolving pivot 10. They are fastened to the base 15. The output lead lines 31L and 32L of coils 29L and 30L are connected to output terminals 33L and 34L. In the same manner, the output lead lines 31R and 32R of coils 29R and 30R are linked to output terminals 33R and 34R. The output terminals 33L and 34L as well as 33R and 34R are linked to the tone arm structure 17 so as to provide left channel and right channel output.

With such a structure, when the reproduction needle 8 follows the sound groove, some lateral pressure may operate on the lateral pressure detector. As a result, the revolving pivot 10 and the cantilever 9 which constitute the detection section are induced into revolving movement which expresses the intensity and direction of the lateral pressure. The magnet 26 positioned behind the fulcrum 18 of the cantilever and fastened to the cantilever moves in a horizontal direction between the yokes. 8-B in FIG. 8 in which the magnet 26 is near the left yokes 27L and 28L represents the state in which this device has received an inwardly directed force. Similarly, 8-C represents the state in which the magnet 26 has approached right yokes 27R and 28R, indicating imposition of outwardly directed force. Since position 8-A, in which magnet 26 is between the left and right yokes, specifically is in the center of plane Z—Z', indicates the dynamic center of the cantilever, it is similar to the state of 6-A in which the inside and outside forces are equal and mutually offsetting. Since the two pairs of left and right yokes shown by 27L, 28L and 27R, 28R have sensitivity to changes in magnetic flux due to the audio signal concerning the vibrational components in the perpendicular direction of magnet 26, the record used may be a stereo record with signal components in the perpendicular direction.

When the magnet is in position 8-B, the left yokes 27L and 28L are nearer the magnet than the right yokes 27R and 28R so that a stronger output would be received from the left channel. In the same way, in state 8-C, the right channel output would be greater. In state 8-A, the outputs of the left and right channels would be equal. In this fashion, the output levels of the left and right channels vary with the direction of lateral pressure. Moreover, since the relative separations of the left and right yokes from the magnet 26 would change slightly depending on the intensity of the lateral pressure, the intensity of the lateral pressure is clearly represented as the difference in the output signals of the left and right channels. Concretely, when the output signals of the left and right channels are given audio expression in the speakers via an amplifier, the direction and intensity of the lateral pressure can be easily known by the position of the sound pattern which is oriented between the left and right speakers. The inside force is stronger when the position of the sound pattern is nearer the left speaker while the outside force is greater when the position is nearer the right speaker. When adjusting the anti-skating device, the amount of outside force is adjusted so that the sound pattern is oriented directly between the left and right speakers.

What is claimed is:

1. A pick up lateral pressure detector detachably mountable on the tone arm of a phonograph record player, said detector comprising
    a base detachably mountable with respect to said tone arm;
    a pivotal member so mounted with respect to said base that the axis of rotation thereof is substantially perpendicular to the surface of the phonograph record;
    a cantilever being mounted at substantially only one point with respect to said pivotal member, said one point being a fulcrum which facilitates the oscillation of said cantilever with respect to said pivotal member at least in a direction substantially parallel to said phonograph record surface, and where the mass of said pivotal member is substantially greater than that of said cantilever so that, at audio frequencies, said oscillation of the cantilever with respect to the pivotal member occurs without rotation of the pivotal member while, at frequencies substantially less than audio frequencies such as those which occur during application of said lateral pressure, rotation of the pivotal member and the cantilever as a single unit occurs;
    a reproduction needle mounted on said cantilever adapted to engage the groove of said phonograph record; and
    indicating means responsive to the rotation of said pivotal member and said cantilever about said axis of rotation of the pivotal member for indicating the lateral pressure of said record groove on said reproduction needle.

2. A detector as in claim 1 where said cantilever is so mounted with respect to said pivotal member it can also oscillate with respect to said pivotal member in a direction substantially perpendicular to said phonograph record surface.

3. A detector as in claim 1 where the longitudinal axis of said cantilever intersects the axis of rotation of the pivotal member.

4. A detector as in claim 1 where the fulcrum of said cantilever is substantially positioned at the axis of rotation of the pivotal member.

5. A detector as in claim 1 where said indicating means includes a magnetic portion on said cantilever and means responsive to the position of said magnetic portion after said rotation of said pivotal member and said cantilever for generating at least one electrical signal and means responsive to said electrical signal for indicating said lateral pressure.

6. A pick up lateral pressure detector detachably mountable on the tone arm of a phonograph record player, said detector comprising
    a base detachably mountable with respect to said tone arm;
    a pivotal member so mounted with respect to said base that the axis of rotation thereof is substantially perpendicular to the surface of the phonograph record;

a cantilever so mounted with respect to said pivotal member that it can oscillate with respect to said pivotal member at least in a direction substantially parallel to said phonograph record surface;

a reproduction needle mounted on said cantilever adapted to engage the groove of said phonograph record;

indicating means responsive to the rotation of said pivotal member and said cantilever about said axis of rotation of the pivotal member for indicating the lateral pressure of said record groove on said reproduction needle; and a variable righting mechanism including a first magnet mounted on said pivotal member and a second magnet mounted on said base, said magnets coacting with one another so that they tend to counteract the said rotation of said pivotal member and said cantilever about said axis of rotation of the pivotal member.

7. A pick up lateral pressure detector detachably mountable on the tone arm of a phonograph record player, said detector comprising a base detachably mountable with respect to said tone arm;

a pivotal member so mounted with respect to said base that the axis of rotation thereof is substantially perpendicular to the surface of the phonograph record;

a cantilever so mounted with respect to said pivotal member that it can oscillate with respect to said pivotal member at least in a direction substantially parallel to said phonograph record surface;

a reproduction needle mounted on said cantilever adapted to engage the groove of said phonograph record;

indicating means responsive to the rotation of said pivotal member and said cantilever about said axis of rotation of the pivotal member for indicating the lateral pressure of said record groove on said reproduction needle; and said indicating means including a pointer pivotally mounted on said base, said pointer having a first magnetic portion and said pivotal member having a second magnetic portion, said first and second magnetic portions so coacting with one another that, during said rotation of said pivotal member and said cantilever, said pointer is rotated to an indication indicative of said lateral pressure.

* * * * *